Patented Nov. 5, 1946

2,410,623

UNITED STATES PATENT OFFICE 2,410,623

RUBBER TACKIFIER

Seaver A. Ballard and John A. Perona, Oakland, Calif., assignors to Shell Development Company, San Francisco, Calif., a corporation of Delaware No Drawing. Application June 14, 1943,
Serial No. 490,947

6 Claims. (Cl. 260—42)

This invention relates to rubber, particularly to synthetic rubber and reclaimed rubber, and more particularly to tackifiers and plasticizers therefor.

In the past decade there have been developed synthetic rubbers with many of the desirable properties of natural rubber without certain limitations of the latter. Synthetic rubber now available can be compounded to compositions of excellent vulcanizing properties yielding products of high tensile strength, elongation, hardness, abrasion resistance and tear resistance. As compared to natural rubber, synthetic rubber may exhibit remarkable resistance to aging and to the physical and chemical action of water, acids, bases, vegetable oils, animal oils, fats, aliphatic and aromatic hydrocarbons. Despite these many points of advantage and superiority, most of the synthetic rubbers have in common one serious defect, i. e. lack of tackiness, a property which is of primary importance in manufacturing operations involving compounding, building or plying-up operations, such as tire construction and the manufacture of belting.

An object of the invention is the provision of tackifiers and plasticizers for synthetic rubber. A further object is to improve the milling characteristics of synthetic rubber. A further object is to facilitate the incorporation of compounding ingredients into synthetic rubber. Another object is to improve the fabricating properties of synthetic rubber. Another object is to provide new synthetic rubber compositions having properties superior to any which have been heretofore developed. Another object is to improve the properties of natural rubber. Other objects are to accomplish these results with reclaimed rubber. Still other objects will be apparent from the description given hereinafter.

We have now found, and our invention is based upon the discovery, that the tackiness and workability of rubber are substantially improved by incorporating therewith certain selected ketone resins. Also in accordance with the invention is the discovery that the tack of rubber compositions containing said ketone resins can be even further increased by treatment with certain agents selected with regard to the particular rubber involved.

The ketone resins with which this invention is concerned can be formed by condensing a higher ketone containing at least 12 carbon atoms in the molecule with an aldehyde in the presence of a condensing catalyst and a substance capable of rendering the reaction mixture homogeneous. Preferred higher ketones are unsaturated ketones such as are formed by the crotonaldehyde-type condensation of a lower ketone with a ketone or an aldehyde according to the process disclosed in U. S. Patent 2,309,650. The process is conducted in the presence of a strong aqueous solution of an acidic or basic, preferably basic, catalyst, the concentration of which is kept substantially constant by the continucus removal of the water formed as a by-product. The ketones used as starting materials may be either saturated or unsaturated compounds, illustrative examples being acetone, methyl ethyl ketone, methyl propyl ketone, diethyl ketone, methyl butyl ketone, methyl isobutyl ketone, methyl vinyl ketone, methyl isopropenyl ketone, mesityl oxide, cyclopentanone and cyclohexanone. These may be condensed with themselves by employing only a single reactant in the reaction mixture, or with other ketones by employing two or more ketones in the reaction mixture. In addition to the ketone or ketones, the reaction mixture may contain one or more aldehydes, suitable examples of which are acetaldehyde, propionaldehyde, butyraldehyde, isobutyraldehyde, ethyl hexaldehyde, acrolein, crotonaldehyde, methacrolein and ethyl propyl acrolein. Of the various ketones and aldehydes which may be reacted, mesityl oxide as a single reactant for the condensation reaction is a preferred substance. The products of the reaction are predominantly unsaturated cyclic ketones having at least 12 carbon atoms in the molecule of which those having at least 24 carbon atoms in the molecule are preferred.

Most of the ketones are believed to be characterized by the conjugated relationship in the molecule of at least one carbon-to-carbon double bond with the double bond of the carbonyl group. These compounds may be defined as carbocyclic ketones of at least 12 carbon atoms containing in the ring the structure

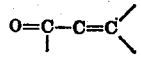

Smaller amounts of unsaturated cyclic ketones having 12 and more carbon atoms in the molecule are formed as secondary products in the condensation of ketones with themselves, with dissimilar ketones or with aldehydes in the presence of relatively dilute solutions of catalyst. As an illustration, when isophorone is prepared by the crotonaldehyde-type of condensation of acetone with itself in the presence of an aqueous solution of an alkali metal hydroxide at 130° C. or above, there are formed significant quantities of higher molecular weight compounds. The same or related compounds are formed in the preparation of homologues of isophorone, as from methyl ethyl ketone. This method of preparing isophorone and its homologues is described and claimed in the co-pending application of Ballard and Haury, Serial Number 474,060, filed January 28, 1943, now U. S. Patent No. 2,399,976. These higher products are preponderantly unsaturated cyclic ketones of 12, 15 and more carbon atoms per molecule. The residue boiling above about 240° C. at 20 mm. pressure, from the fractional distillation of the higher unsaturated cyclic ketones obtained as secondary products in the manufacture of isophorone by the process just described is a particularly effective tackifier.

Another method of forming high unsaturated cyclic ketones consists in condensing isophorone to crystalline di-isophorone in the presence of an alkali metal hydroxide or alkali metal alcoholate condensation catalyst. The method is described and claimed in the co-pending application of Ballard and Haury, Serial Number 390,744, filed April 28, 1941. The primary product is a bicyclic unsaturated ketol. As secondary products, are formed other unsaturated ketones of 12, 15 and more carbon atoms per molecule, which can be separated from the remainder of the reaction mixture used in accordance with the invention. Here again, the residue, boiling above about 240° C. at 20 mm. pressure, from the fractional distillation of the higher unsaturated cyclic ketones obtained as secondary products in the manufacture of di-isophorone by the process just described is a particularly effective product.

While the unsaturated higher ketones are most desirable for use in preparing the resins with which the invention is concerned, the saturated ketones prepared by hydrogenation with saturation of the double bonds in the unsaturated compound, or by conversion of the unsaturated ketones to saturated alcohols followed by dehydrogenation of the carbinol group therein to give a saturated ketone are also suitable. The resins prepared from the saturated ketones, however, are products of somewhat different character from those derived from the unsaturated compounds containing more than one carbon-to-carbon double bond in the molecule.

The ketone resins are formed by reacting the higher ketones referred to with aldehydes. Formaldehyde is the preferred reactant, but other aldehydes can be used, examples of which are acetaldehyde, propionaldehyde, butyraldehyde, isobutyraldehyde, acrolein, crotonaldehyde and benzaldehyde, together with their homologues, analogues and suitable substitution products. Besides the free, uncombined aldehydes, polymers of the aldehydes, such as para-formaldehyde, para-aldehyde and meta-aldehyde, can be used. Preferred catalysts for the reaction are the hydroxides, oxides and alcoholates of the alkali metals, and strong organic bases, such as the quaternary ammonium bases. Other catalytic bases are the alkaline earth hydroxides and oxides. Acidic catalysts include sulfuric acid, hydrochloric acid, phosphoric acid, telluric acid, tungstic acid and the acid salts, such as sodium acid sulfate. The catalysts will ordinarily be employed as suspensions or solutions, preferably the latter, in an organic medium or water. The higher ketones employed as starting materials in making the resins are substantially insoluble in water and in aqueous solutions of the aldehydes such as an aqueous solution of the most preferred reactant, formaldehyde. In order that the reaction between the ketones and aldehydes be effected readily, it is desirable that the reaction mixture be in a homogeneous state, i. e., that the reactants and catalyst be in a solution comprising a single phase, at least at the start and early part of the reaction. To this end, a homogenizing solvent is employed in the reaction mixture. In the absence of a homogenizing solvent, the yield of resin is very low. Many solvents are suitable for this purpose and the choice of a particular solvent will depend upon the particular reactants employed, the catalyst used and the presence or absence of water in the mixture. The lower aliphatic alcohols are particularly suitable homogenizing solvents. The amount of these homogenizing solvents employed will depend upon the character of the reaction mixture. In general, sufficient homogenizing solvent is used so that the reaction mixture is homogeneous at least when first heated to effect the reaction.

The homogenizing solvent may serve a twofold purpose in the process. Besides rendering the reaction mixture homogeneous, it may also be used to regulate the temperature of the reaction mixture during the heating thereof since ordinarily the reaction is effected at not overly high temperatures. By heating the reaction mixture in a vessel fitted with a reflux condenser, the temperature may be made to reach and hold the boiling temperature of the mixture and this may very well be largely dependent upon the refluxing temperature of the homogenizing solvent especially after the reaction has progressed to a considerable extent with substantially no other lower boiling constituents remaining in the mixture. To effect the desired reaction temperatures, in general, between about 50° C. and 150° C. are employed.

Upon completion of the resin-forming condensation reactions between the ketones and aldehydes, the resin may be recovered from the reaction mixture by several suitable methods. A preferred procedure is to wash the mixture with a catalyst solvent such as water so that the mixture will be substantially freed of the condensing agent. If desired, however, the catalyst may be destroyed by neutralization with an appropriate acidic or basic substance. The mixture may then be distilled, first at higher pressures such as atmospheric to remove the homogenizing solvent, catalyst solvent, unreacted reactants and low-boiling products, and secondly at reduced pressures to remove higher-boiling products from the ketone resin. By completing the distillation operation at very low pressures of 1 to 10 mm. of Hg and at temperatures between about 150° C. and 250° C., but below a temperature at which appreciable thermal decomposition of the resin occurs, the resin is obtained in a hard, brittle, desirable form. Besides the above-outlined scheme of recovery of the resin, other methods may be employed, if desired, such as fractional precipitation, extraction and the like.

Preparation of the resins are illustrated in the following examples:

*Example I*

About 178 gm. of 12 carbon atom unsaturated ketones obtained by the condensation of mesityl oxide was mixed with 81 gm. of 37% aqueous formaldehyde solution. To this mixture was added approximately 5 gm. of 30% aqueous sodium hydroxide solution and about 95 gm. of methanol which rendered the mixture homogeneous. The mixture was contained in a flask fitted with a reflux condenser and upon heating the contents of the flask, the temperature of the mixture remained at about 76° C. owing to the refluxing of the methanol therein. The mixture remained homogeneous for about ½ hour after which two liquid phases separated. The heating was continued over a total period of about 3 hours. The mixture was then cooled, brine added and the resin phase extracted with ether. The ether was dried with anhydrous sodium sulphate and the ether distilled therefrom. The remaining oil was then distilled in vacuo and after removal of the distillable material, about 106 gm. of a reddish, brittle, transparent resin was obtained. This resin had a color corresponding to E on the resin color scale and was soluble in alcohols, ketones, esters, aromatic hydrocarbons and paraffinic hydrocarbons. A cryoscopic determination in glacial acetic acid indicated the molecular weight was about 530. Exposure of the resin to the action of air increased its oxygen content and changed it to a form which was insoluble in paraffinic hydrocarbons.

The presence of the homogenizer in the reaction mixture is essential to obtaining a practical rate of resin formation. With a reaction mixture containing the same amount of identical reactants, but in the absence of the homogenizer, methyl alcohol, which was treated under the same conditions as in the preceding example, the quantity of resin amounted to less than one gram.

Example II

A mixture containing about 258 gm. of unsaturated ketones with 18 carbon atoms per molecule prepared by condensing mesityl oxide, about 83 gm. of 36% aqueous formaldehyde solution, and about 0.5% of sodium hydroxide in the form of an aqueous solution was prepared. To this mixture was added about 170 gm. of methanol to make it homogeneous and the mixture was then heated for approximately three hours at a temperature of 65±5° C. The resin formed was recovered in a similar manner to that described in Example I and amounted to about 202 gm. The resin was a light red brittle solid which was slightly darker in color than that obtained according to the method of Example I.

Example III

Approximately 169 gm. of $C_{24}$ unsaturated ketones from condensation of mesityl oxide, about 42 gm. of 36% aqueous formaldehyde solution, and 0.5% sodium hydroxide as aqueous solution together with about 325 gm. of methanol were heated at a temperature of 65±5° C. for three hours. About 169 gm. of light red brittle resin was recovered from the reaction mixture which was slightly darker in color than that described in Example II.

Example IV

Tetra ethyl ammonium hydroxide was tested as a polymerization catalyst by heating a mixture consisting of about 178 gm. of the $C_{12}$ unsaturated ketones described in Example I, 81 gm. of 37% aqueous formaldehyde solution, 120 gm. of methanol, and 20 gm. of 10% aqueous tetraethyl ammonium hydroxide. The mixture was refluxed at about 78° C. for three hours. The product was washed with water and distilled in vacuo. After removal of unreacted unsaturated ketones and lower-boiling constituents, there remained about 107 gm. of light-colored, hard, brittle resin having a color of G on the resin color scale.

Example V

A mixture containing about 178 gm. of $C_{12}$ unsaturated ketones from condensation of mesityl oxide, 30 gm. of formaldehyde in the form of a 37% aqueous solution, 5% of 96% sulfuric acid, and sufficient methanol to homogenize the mixture was heated at refluxing temperature for approximately three hours. The resin which was recovered was dark red in color.

Example VI

About 368 gm. of saturated ketones containing 12 carbon atoms per molecule obtained by condensing mesityl oxide and saturating the $C_{12}$ condensation products with hydrogen were mixed with about 162 gm. of 37% aqueous formaldehyde solution and 400 gm. of methanol. To this mixture was added about 9 gm. of 30% aqueous sodium hydroxide solution. The mixture was then heated at a refluxing temperature of about 73° C. for four hours. During the heating the reaction mixture became yellowish in color and turbid. About 200 gm. of methanol were distilled from the mixture in the last one and a half hours of heating. The resin was recovered by distillation in vacuo. Approximately 60 gm. was obtained which was a red, brittle, tacky solid.

Example VII

A mixture was prepared containing about 178 gm. of $C_{12}$ unsaturated ketones from condensation of mesityl oxide, 200 gm. of methanol, and 5 gm. of 30% aqueous sodium hydroxide solution. To this mixture there was added about 44 gm. of acetaldehyde in 100 gm. of methanol in the course of 15 minutes while maintaining the temperature at about 15° C. The entire mixture was then heated for about 3 hours at a refluxing temperature of about 69° C. The product was water-washed and distilled. The resin obtained amounted to about 38 gm. and was a dark red, brittle solid with the following solubility characteristics:

| Solvent | Cold | Hot |
| --- | --- | --- |
| P and V thinner | Partly soluble | Soluble. |
| Acetone | Readily soluble | Do. |
| Methanol | Slightly soluble | Slightly soluble. |
| Carbon tetrachloride | Soluble | Soluble. |
| Normal butyl acetate | do | Do. |
| Diethyl ether | do | Do. |
| Isopropanol | do | Do. |

Example VIII

Approximately 178 gm. of $C_{12}$ unsaturated ketones from condensation of mesityl oxide, 106 gm. of benzaldehyde, 4 gm. of 30% aqueous sodium hydroxide solution, and 150 gm. of methanol were heated at about 72° C. for 5 hours. The reaction product was washed with water and distilled under subatmospheric pressure. The distillable material at about 215° C. under 1 mm. pressure was removed and about 11 gm. of dark red resin remained. This resin was soluble in P and V thinner, ketones, alcohols higher than methanol and slightly soluble in methanol.

The process applies not only to individual ketones but also to mixtures of ketones, particularly to the high boiling residues from the manufacture of isophorone and di-isophorone, and to the products of the complete or partial hydrogenation thereof. Each and all of these products of the reaction of an aldehyde with cyclic ketones having at least 12 carbon atoms in the molecule are capable of significantly increasing the tack of synthetic and reclaimed rubber.

The ketone resins can, if desired, be subjected to treatment in any of several different ways. The properties of the resins can be modified, for instance, by oxidation, hydrogenation or halogenation.

The invention applies to substantially all synthetic rubbers, natural rubber, and reclaimed rubber. Examples of synthetics are polymers of butadiene, the pentadienes, the hexadienes, the heptadienes, the octadienes and the nonadienes, polychloroprene ("GR-M"), polyisobutylene, polyvinyl chloride, and copolymers of any or all of these materials with one another and with small amounts of other polymerizable compounds, as well as to mixtures of the various polymers. Examples of said other polymerizable compounds are acrylonitrile, methacrylonitrile, styrene, methyl methacrylate and methyl vinyl ketone. An important class consists of co-polymers of butadiene and acrylonitrile, as exemplified by "Hycar O. R.," "Perbunan" and "Perbunan Extra." The percentage of acrylonitrile in the co-polymers is ordinarily between about 10% and about 40% by weight of the total, although not necessarily limited to this range. Also important are butadiene-styrene co-polymers, such as "Buna S," "Buna SS" and "GR-S." The tackifiers of this invention are of maximum potency when used in conjunction with butadiene-acrylonitrile co-polymers. Another important co-polymer type is that of isobutylene with a small amount of butadiene, known as "butyl" rubber, or "GR-I." The invention applies also to natural rubber; to compositions comprising both synthetic rubber and reclaimed rubber; to compositions comprising either synthetic rubber or reclaimed rubber; and to mixtures of the three types of rubber, synthetic, reclaimed and natural.

The invention is not to be considered limited to the examples of synthetic rubber listed above since it appears applicable to all synthetic substances having the approximate physical properties of natural rubber. The term "synthetic rubber" as used in this application is substantially equivalent to "elastomer," as suggested by H. L. Fisher, Ind. Eng. Chem. 31, 941 (1939), or to "synthetic elastomer." The unqualified term "rubber" is used in a generic sense to include synthetic, reclaimed and natural rubber.

The amount of tackifier used is subject to wide variation according to the type of synthetic rubber or reclaimed rubber involved, the kind and amount of other modifiers, the conditions of milling, refining, storage and vulcanization, and the intended use of the product. The usual range is from about 2 parts to about 25 parts of tackifier per 100 parts of rubber. With less than the smaller amount the action is ordinarily insignificant. More than the larger amount may, in some instances, impair the tensile strength and reduce the rate of vulcanization. Nevertheless in many cases excellent results are obtained by the use of as high as 50 parts of ketone resins per 100 parts of rubber.

Raw synthetic rubber is generally supplied in a massive state, free from other than minor quantities of solvents and other diluents. The tackifiers will usually be incorporated with the raw material in a Banbury mixer or on an open mill, using tight-set, cold rolls. The addition of at least a portion of the tackifier early in the milling operation hastens the breakdown of the rubber, reduces the heat build-up, and otherwise facilitates the operation by rendering the stock less nervy and more plastic. According to the wishes of the operator and the idiosyncrasies of the particular composition, the addition may be made at any time from the commencement to the completion of milling. Where compounding on a roll mill is followed by refining in a special refining mill, the addition of all or part of the tackifier may be made in the second operation. If desired, mastication and compounding can easily be effected in a Banbury mixer.

The raw synthetic is sometimes supplied in the form of an emulsion in a liquid, usually water, in which form it closely resembles the latex of natural rubber. This form is usually produced by first emulsifying the monomeric material and subsequently polymerizing, in which case the tackifier is conveniently added to the emulsion of previously prepared polymer. In some cases it may be desirable to add the tackifier either to the dispersed phase or to the dispersing phase prior to or during the course of polymerization. Other methods of incorporating the tackifier with the stock will occur to those skilled in the art.

Other materials in addition to tackifiers will usually be compounded with synthetic rubber and reclaimed rubber. While the tackifiers of the present invention exhibit a plasticizing, as well as tackifying, action, it may be desirable also to use certain additional plasticizers, of which the following are common examples: dibutyl phthalate, dioctyl phthalate, tricresyl phosphate, triacetin, tetralin, soft coal tar, cumar resins, soft factice, wool grease, stearic acid, lauric acid, and waxes. Not more than very small amounts of the last four ingredients should be used.

One or more anti-oxidants will ordinarily be present, the most common one being phenyl beta-naphthyl amine. Illustrative of other anti-oxidants useful in synthetic and reclaimed rubber are $p$-hydroxy diphenyl, hydroquinone, $p$-aminophenol, $p,p'$-diamino-diphenylmethane, 2,4-n-toluylene diamine, diphenylamine, o-ditolylamine, $p$-ditolylamine, phenyl $\alpha$-naphthyl amine, phenyl $\beta$-naphthylnitroso amine, symmetrical di-$\beta$-naphthyl-$p$-phenylene diamine, diphenyl diamino ethane and 2,4-diaminodiphenylamine.

As with natural rubber, carbon black is made an ingredient of synthetic rubber compositions because it acts not only as a filler and stiffener but also, and more important, as an agent to increase the tensile strength. With some synthetics, however, notably polychloroprene, no such increase obtains. The choice of type of carbon black will depend upon many factors, principally the nature of the synthetic and the purpose of the composition. Soft and hard channel black, thermal decomposition black and semi-reinforcing furnace black are common types. The properties of the composition may be modified with other pigments, such as iron oxide, titanium dioxide, barytes, zinc oxide, hydrated alumina, lithopone, and whiting.

Most synthetic rubbers can be vulcanized by procedures similar to those used for natural rubber. Among the exceptions are the polymeric compounds which do not possess unsaturated carbon-to-carbon linkages, e. g. polymers of isobutene and vinyl chloride, and are considered unvulcanizable. It has been noted, however, that the addition of a substantial amount, usually from about 10% to about 50%, of the higher unsaturated cyclic ketones of the invention to such polymers results in compositions which, when subjected to the usual vulcanization conditions, undergo certain physical changes resembling those occurring with certain other compositions on vulcanization. Some of the synthetics can be vulcanized without the addition of vulcanizing agents, although with most of these vulcanization is promoted by their use. Sulfur is the common vulcanizing agent. Other agents used, generally with less success, are sulfur-containing compounds, such as sulfur dioxide, hydrogen sulfide and sulfur thiocyanate; oxygen and oxygen yielding compounds, such as ozone, organic and inorganic peroxides; selenium, halogens and halogen-containing compounds, and; nitrogen-containing compounds, such as the nitrobenzenes. With polychloroprene metallic oxides, principally magnesium oxide, zinc oxide and litharge, act as vulcanization agents.

In addition to vulcanization agents, vulcanization accelerators are added. Illustrative examples of accelerators are tetramethyl thiuram disulfide, zinc dibutyl di-thiocarbamate, tetramethyl thiuram monosulfide, dipentamethylene-thiuram tetrasulfide, mercapto benzo thiazole, hexamethylene-tetramine, aldehyde-ammonia, diphenylguanidine, diphenylthiourea, benzo thiazyl disulfide, piperidinium pentamethylene-dithiocarbamate, di-o-tolylguanidine, triphenylguanidine and lead dimethyldithiocarbamate. Some of these are considerably more effective than others. With polychloroprene, sulfur and catechol act as accelerators. Zinc oxide is usually added, its action being that of an inorganic accelerator or an activator of vulcanization accelerators.

The order of addition of the various ingredients may be varied in any way in accordance with the wishes of the operator as directed by his experience in preparing the compositions. The constituents of the compositions, and the order and method of compounding are factors which do not form a part of the present invention, except that synthetic, natural or reclaimed rubber and the indicated ketones or derivatives thereof are necessarily involved.

The compounded compositions are subject to numerous shaping operations known in the art. Sheets can be formed by calendering on heated rolls or by casting from solutions. Sheets, rods, tubes and coatings can be formed by continuous or discontinuous extrusion. Articles of substantially any shape can be made by operations using open or closed molds. The compositions can be applied to fibrous material, such as fabric, by calendering or by impregnation with a suitable emulsion. These shaping operations and many others are facilitated by the presence of one or more of the tackifiers of the present invention in the compositions.

Shaped structures of synthetic rubber, and structureless material as well, are often required to undergo additional fabrication, a prominent illustration being the laminating, or plying-up, of tire casings. Here are involved the cohesion of the synthetic material to itself and its adhesion to different material, in addition to other factors contributing to workability. Ease of fabrication and the quality of the resulting product are increased by the presence of the tackifiers herein described.

It has been discovered that the tack of rubber compositions containing the ketone resins with which the invention is concerned can be even further increased by treatment with certain agents selected with regard to the particular rubber involved. Satisfactory tack-increasing agents are those which exhibit infinite solubility in the ketone resin tackifiers, which boil between about 50° C. and about 200° C. at atmospheric pressure, and which are weak solvents or vigorous swelling agents for the rubber or synthetic.

For compositions of co-polymers of butadiene and acrylonitrile containing ketone resin tackifiers, suitable tack-increasing agents are aliphatic, including alicyclic, carbonylic compounds of 3 to about 10 carbon atoms boiling within the stated range. Representative examples are acetone, methyl ethyl ketone, methyl n-propyl ketone, methyl isopropyl ketone, methyl n-butyl ketone, methyl isobutyl ketone, methyl t-butyl ketone, mesityl oxide, diacetyl and isophorone. Methyl ethyl ketone is preferred.

For compositions of co-polymers of butadiene and styrene containing ketone resin tackifiers, the best tack-increasing agents are normally liquid aromatic and aliphatic hydrocarbons and halogenated hydrocarbons boiling between about 50° C. and 200° C. Among the suitable compounds are carbon tetrachloride, chloroform, benzene, toluene, monochlorobenzene and monochlorotoluene. Benzene and monochlorobenzene are preferred.

The tack-increasing agent can be added to the stock prior to or during compounding, or to the compounded material prior to shaping. As an example may be mentioned the incorporation of a tack-increasing agent and volatile solvent with synthetic rubber in such proportions as to form an adhesive paste or liquid. In most cases, however, the agent will be used to treat the surfaces of a shaped or fabricated structure.

The structure can be dipped in undiluted tack-increasing agent, removed, freed from excess liquid and used in the desired manner. In a modified procedure the structure is immersed in a solution of the agent in a solvent therefor which is inert to, or has a swelling action upon, the structure. In another procedure the immersion bath comprises a dispersion of the agent in an organic or inorganic liquid. Another method is to lightly wash the surfaces of the solid structure with the agent, allow the ketone to partially or completely evaporate, and then immediately to bring the surfaces into contact with the surfaces of the same or other material, which latter surfaces, preferably but not necessarily, have been also just previously subjected to treatment with the agent.

Another method is to use a mixture of tack-increasing agent, rubber composition, and a substance which is a solvent for both said agent and said composition. The mixture is applied to the surfaces of the structure, which are then pressed against similar or other surfaces, and preferably vulcanized under the influence of heat.

The tack-increasing agents of the present invention are unique in their action. No other agents which have been tested increase to a comparable degree the tack of compositions containing the higher ketone resins. Conversely, the agents are substantially ineffective when used with compositions which contain no tackifiers, or which contain one or more of the so-called tackifiers heretofore available.

The vulcanization of vulcanizable synthetic rubber takes place under conditions similar to those used with natural rubber. Likewise, the same equipment can be employed. Polymers which do not contain unsaturated carbon-tocarbon bonds are considered unvulcanizable. In substantially all cases vulcanization of compositions containing the requisite components occurs slowly at room temperature, and is accelerated by increase in temperature. The upper limit of the temperature of vulcanization is ordinarily determined only by the degradation or decomposition of the material, or by the volatility of one or more of its constituents.

The synthetic, natural and reclaimed rubber compositions of the present invention can be used for all of the purposes to which other such compositions are applied. Examples which come readily to mind are balloon coverings, umbrellas, raincoats, table covers, shower curtains and garment bags, for which cloth impregnated with synthetic rubber has been found highly suitable; electrical insulation; friction tape, hose for the handling of petroleum products and of paints; lining and exterior coating in self-sealing gasoline tanks; gaskets; belts for conveying and for the transmission of power; vibration dampeners, for which several synthetics are ideal by virtue of their high absorption of energy; printers rolls, printers blankets and engraving plates; shoe soles and heels; aprons; gloves; gas masks and clothing resistant to the penetration of poisonous gases. The most prominent example is the use of synthetics in automobile tire tubes and tire casings.

Example IX

A co-polymer of butadiene and acrylonitrile was compounded with a resin formed by after-hydrogenating the condensation product of formaldehyde with a mixture of $C_{12}$ and $C_{15}$ unsaturated ketones obtained as a by-product in the manufacture of isophorone in accordance with U. S. Patent No. 2,399,976. The following master formula was used:

| | Parts |
|---|---|
| "Hycar O. R." | 100 |
| Phenyl β-naphthylamine | 1 |
| Benzothiazyl disulfide | 1.25 |
| Ketone resins | 25 |
| Zinc oxide | 5 |
| Carbon black | 50 |
| Stearic acid | 0.5 |
| Sulfur | 1.25 |

Compounding was effected on close-set milling rolls cooled with water at 10° C. to 20° C. The stock was first masticated for several minutes, following which the ingredients were added one at a time in the order given. The material was cut and folded on the mill in a standard manner. After compounding, the material was stored for several hours under room conditions, and subsequently remilled. On calender rolls sheets approximately 0.01" thick were formed.

Strips cut from the sheets were pressed together. Considerable tackiness was evidenced when the strips were subsequently separated.

Strips of a similar composition containing dibutyl sebacate in place of the ketone resin were substantially without tack. The same result was obtained with compositions containing a number of other common plasticizers, including dibutyl phthalate, rosin and soft coal tar.

The surfaces of all the strips were washed lightly with methyl ethyl ketone, allowed to dry for about 2 minutes and then again subjected to the tackiness test. In the cases of the compositions containing ordinary plasticizers, the increase in tackiness was slight or negligible, whereas with the strips containing the ketone resin tackiness was greatly increased.

Example X

A ketone resin formed by the condensation of formaldehyde with a $C_{18}$ unsaturated ketone formed by the condensation of mesityl oxide with itself in accordance with the process disclosed in U. S. Patent 2,309,650 was compounded with "Buna S" under the following formula:

| | Parts |
|---|---|
| "Buna S" | 100 |
| Ketone resin | 10 |
| Phenyl β-naphthylamine | 1 |
| Benzothiazyl disulfide | 1.25 |
| Zinc oxide | 5 |
| Stearic acid | 1 |
| Channel black | 50 |
| Sulfur | 1.5 |

The tackiness of the composition was considerably greater than that of otherwise similar material containing conventional plasticizers in lieu of the ketone resin. The tackiness of the composition was materially increased by washing with benzene, whereas the washing was substantially ineffective on the tackiness of the conventional material.

Example XI

The following composition was compounded on cold rolls in the usual manner, the resin used being the condensation product of formaldehyde with a mixture of $C_{12}$ and $C_{15}$ unsaturated ketones obtained as a by-product in the manufacture of isophorone in accordance with U. S. Patent No. 2,399,976.

| | Parts |
|---|---|
| "Chemigum IV" | 100 |
| Carbon black | 50 |
| Ketone resin | 20 |
| "Captax" | 1.5 |
| Zinc oxide | 5 |
| Sulfur | 2 |

15 parts of the composition were dissolved in 100 parts of a solvent consisting of 90 parts benzene and 10 parts methyl ethyl ketone. The surfaces of strips of the composition (not containing said solvent) were painted with the mixture. The surfaces were placed in mutual contact and subjected to vulcanizing condition under pressure. The bond so formed was of such strength that the strips could not be separated without tearing.

We claim as our invention:

1. A tacky composition of matter comprising 100 parts by weight of a rubber-like polymer of a diene hydrocarbon having admixed therewith 2 to 50 parts by weight of a resinous product obtained by condensing a single aldehyde in the presence of a condensation catalyst with a crotonaldehyde-type of auto-condensation product of a lower aliphatic ketone of 3 to 6 carbon atoms, which auto-condensation product contains at least 12 carbon atoms.

2. A tacky composition of matter comprising 100 parts by weight of a rubber-like polymer of a diene hydrocarbon having admixed therewith 2 to 50 parts by weight of a resinous product obtained by condensing a single aliphatic aldehyde in the presence of a basic condensation catalyst with a crotonaldehyde-type of auto-condensation product of acetone, which auto-condensation product contains at least 12 carbon atoms.

3. A tacky composition of matter comprising 100 parts by weight of a rubber-like copolymer of butadiene and acrylonitrile having admixed therewith 2 to 50 parts by weight of resinous product obtained by condensing formaldehyde as the sole aldehyde in the presence of a condensation catalyst with the crotonaldehyde-type of auto-condensation product of a lower aliphatic ketone of 3 to 6 carbon atoms, which auto-condensation product contains at least 12 carbon atoms.

4. A tacky composition of matter comprising 100 parts by weight of a rubber-like copolymer of butadiene and acrylonitrile having admixed therewith 2 to 25 parts by weight of resinous product obtained by condensing formaldehyde as the sole aldehyde in the presence of a basic condensation catalyst with the crotonaldehyde-type of auto-condensation product of acetone, which auto-condensation product contains at least 12 carbon atoms.

5. A tacky composition of matter comprising 100 parts by weight of a rubber-like copolymer of butadiene and acrylonitrile having admixed therewith 2 to 25 parts by weight of resinous product obtained by condensing formaldehyde as the sole aldehyde in the presence of a condensation catalyst with the crotonaldehyde-type of auto-condensation product of mesityl oxide, which auto-condensation product contains 18 carbon atoms.

6. A tacky composition of matter comprising 100 parts by weight of a rubber-like copolymer of butadiene and styrene having admixed therewith 2 to 50 parts by weight of resinous product obtained by condensing formaldehyde as the sole aldehyde in the presence of a condensation catalyst with the crotonaldehyde-type of auto-condensation product of a lower aliphatic ketone of 3 to 6 carbon atoms, which auto-condensation product contains at least 12 carbon atoms.

SEAVER A. BALLARD.
JOHN A. PERONA.